(12) United States Patent
Kempshall

(10) Patent No.: US 11,738,865 B1
(45) Date of Patent: Aug. 29, 2023

(54) CONVERTIBLE UNMANNED VEHICLE

(71) Applicant: Hyalta Aeronautics, Inc., St. Petersburg, FL (US)

(72) Inventor: Scott R. Kempshall, St. Petersburg, FL (US)

(73) Assignee: Hyalta Aeronautics, Inc., St. Petersburg, FL (US)

(*) Notice: Subject to any disclaimer, the term of this patent is extended or adjusted under 35 U.S.C. 154(b) by 17 days.

(21) Appl. No.: 17/589,032

(22) Filed: Jan. 31, 2022

Related U.S. Application Data

(60) Provisional application No. 63/144,141, filed on Feb. 1, 2021.

(51) Int. Cl.
*B64C 39/02* (2023.01)
*B64C 39/00* (2023.01)
*B64C 27/28* (2006.01)
*B64U 30/12* (2023.01)
*B64U 30/20* (2023.01)
*B64U 50/14* (2023.01)
*B64U 70/70* (2023.01)

(52) U.S. Cl.
CPC ............ *B64C 39/024* (2013.01); *B64C 27/28* (2013.01); *B64C 39/006* (2013.01); *B64U 30/12* (2023.01); *B64U 30/20* (2023.01); *B64U 50/14* (2023.01); *B64U 70/70* (2023.01)

(58) Field of Classification Search
CPC ..... B64C 39/024; B64C 39/006; B64C 37/00; B64U 30/12; B64U 30/20; B64U 50/14; B64U 70/70; F41A 1/00; F42B 10/00; F42B 10/38
See application file for complete search history.

(56) References Cited

U.S. PATENT DOCUMENTS

| | | | | |
|---|---|---|---|---|
| 7,959,104 | B2* | 6/2011 | Kuntz | B64C 29/0033 244/50 |
| 8,827,200 | B2* | 9/2014 | Radu | B60F 5/02 244/23 B |
| 9,156,550 | B2* | 10/2015 | Nam | B64C 11/00 |
| 9,969,491 | B2* | 5/2018 | Strayer | B63G 3/04 |
| 10,081,424 | B2* | 9/2018 | Radu | B64C 29/0033 |
| 10,549,850 | B1* | 2/2020 | Ryan | B64U 80/70 |
| 10,641,290 | B1* | 5/2020 | Piasecki | B64C 7/02 |
| 2010/0181414 | A1* | 7/2010 | Lopez, Jr. | B64C 29/0033 244/12.4 |
| 2013/0068876 | A1* | 3/2013 | Radu | B60F 5/02 244/2 |

(Continued)

*Primary Examiner* — Justin M Benedik
(74) *Attorney, Agent, or Firm* — Nicholas Pfeifer Smith & Hopen, P. A.

(57) ABSTRACT

An unmanned vehicle having a launch configuration and one or more operational configurations. In the launch configuration, one or more engines resides within an engine bay. The unmanned vehicle is generally shaped like a projectile and can be launch from any tube-shaped deployment system using an initial propulsor. The engine bay can be opened, and the engines can be moved into a generally external position with respect to the engine bay for operation of said engines. In some embodiments, the one or more engines can pivot to direct thrust in multiple directions. In some embodiments, the unmanned vehicle includes flight control surfaces to further improve the flight characteristics of the vehicle.

20 Claims, 9 Drawing Sheets

(56) References Cited

U.S. PATENT DOCUMENTS

| | | | |
|---|---|---|---|
| 2014/0151496 A1* | 6/2014 | Shaw | B64C 27/28 244/17.23 |
| 2016/0114887 A1* | 4/2016 | Zhou | H04N 7/181 348/148 |
| 2016/0272317 A1* | 9/2016 | Cho | B60Q 7/005 |

* cited by examiner

CONVERTIBLE UNMANNED VEHICLE

CROSS-REFERENCE TO RELATED APPLICATIONS

This nonprovisional application is a continuation of and claims priority to provisional application No. 63/144,141, entitled "CONVERTIBLE UNMANNED VEHICLE," filed Feb. 1, 2021 by the same inventor(s).

BACKGROUND OF THE INVENTION

1. Field of the Invention

This invention relates, generally, to unmanned vehicles. More specifically, it relates to unmanned vehicles capable of converting between one or more configurations.

2. Brief Description of the Prior Art

The transportation and deployment of unmanned vehicles (UVs), such as unmanned aircraft vehicles (UAVs) are important considerations for the armed forces and some commercial applications when it comes to implementing UVs. Often times users are required to transport these vehicles to a particular destination before deploying said vehicles. As a result, there is a need to provide a compact, lightweight vehicle that can be easily and quickly deployed for a specific mission or role. In fact, the military has expressed particular interest in the deployment of UVs using mortar tubes or other forms of tubular projectile-based deployment systems.

Accordingly, there is a need for an improved UV design that can be quickly and easily launched from tubular deployment systems or stored and transported in a canister-like configuration. However, in view of the art considered as a whole at the time the present invention was made, it was not obvious to those of ordinary skill in the field of this invention how the shortcomings of the prior art could be overcome.

While certain aspects of conventional technologies are provided herein to facilitate the disclosure of the invention, Applicant(s) in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved UV that can be quickly and easily launched is now met by a new, useful, and nonobvious invention.

The novel structure of an embodiment of the UV includes a launch configuration and at least one operational configuration. A main body includes a structural support extending generally between a fore end and an aft end of the unmanned vehicle. An outer surface has a generally cylindrical shape with an engine bay established within the outer surface of the main body. The main body further includes a door leading to the engine bay. The door is configured to be opened to expose at least one engine that is configured to reside within the engine bay when the unmanned vehicle is in the launch configuration. In some embodiments, the engine bay door is configured to detach from the main body when the unmanned vehicle transitions to the at least one operational configuration.

The UV further includes a first articulating arm operably connected to the structural support. The first articulating arm is pivotably connected to the engine and is configured to move at least a portion of the engine(s) outside of the engine bay. The at least one operational configuration of the unmanned vehicle includes the engine(s) residing at least partially outside of the engine bay.

Some embodiments of the UV include a first pair of engines configured to reside within the engine bay when the unmanned vehicle is in the launch configuration. The first articulating arm is rotatably secured to the structural support and includes a pair of free ends, with each free end pivotably secured to one of the first pair of engines. When in the launch configuration, the first articulating arm is rotated to a stored position, which includes the first pair of engines residing within the engine bay. When in the at least one operational configuration, the first articulating arm is rotated to an extended position, which includes the first pair of engines residing at least partially outside of the engine bay.

Some embodiments of the UV further include a second pair of engines configured to reside within the engine bay when the unmanned vehicle is in the launch configuration. In addition, a second articulating arm is operably connected to the structural support. The second articulating arm is rotatably secured to the structural support and includes a pair of free ends, with each free end pivotably secured to one of the second pair of engines.

When the UV is in the launch configuration, the second articulating arm is rotated to a stored position. The stored position includes the second pair of engines residing within the engine bay. When in the at least one operational configuration, the second articulating arm is rotated to an extended position, which includes the second pair of engines residing at least partially outside of the engine bay.

In some embodiments, the at least one operational configuration includes an axial thrust configuration and a vertical thrust configuration. In the axial thrust configuration, the engine(s) is oriented to direct thrust in a direction that is towards an aft end of the unmanned vehicle. In the vertical thrust configuration, the engine(s) is oriented to direct thrust in a generally vertical direction.

In some embodiments, the at least one operational configuration further includes a land vehicle configuration. The land vehicle configuration includes the engine(s) having a shroud, the shroud in contact with a ground surface, and the engine(s) configured to rotate the shroud, such that the shroud acts as a wheel.

Some embodiments of the UV further include a pair of wings. Each wing has a stored position and an extended position. In the stored position each wing is configured to reside within the main body when the main body is in the launch configuration. In the extended position, each wing extends laterally with respect to a longitudinal axis of the unmanned vehicle.

Some embodiments of the UV further include a nose cone. The nose cone may be configured to detach from the main body when the unmanned vehicle transitions to the at least one operational configuration.

Some embodiments of the UV further include a thrust vectoring nozzle secured to the aft end of the unmanned vehicle. The nozzle may be configured to detach from the main body.

Some embodiments of the UV further include an initial propulsor secured to the aft end of the unmanned vehicle. The initial propulsor may be configured to detach from the main body.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The present invention includes UV 100 adapted to be stored and/or launched from a tube-shaped deployment system, such as a mortar tube, shoulder mounted rocket launcher, submarine ejector tube, etc. As such, some embodiments of UV 100 are configured to have several configurations, including a launch configuration in which UV 100 is generally shaped like a projectile. The projectile shape, as exemplified in FIG. 1, allows UV 100 to be launched from a launch tube. Upon exiting the launch tube, UV 100 can convert to one of the configurations depicted in the exemplary figures, which will be explained in greater detail below.

Figure 1:
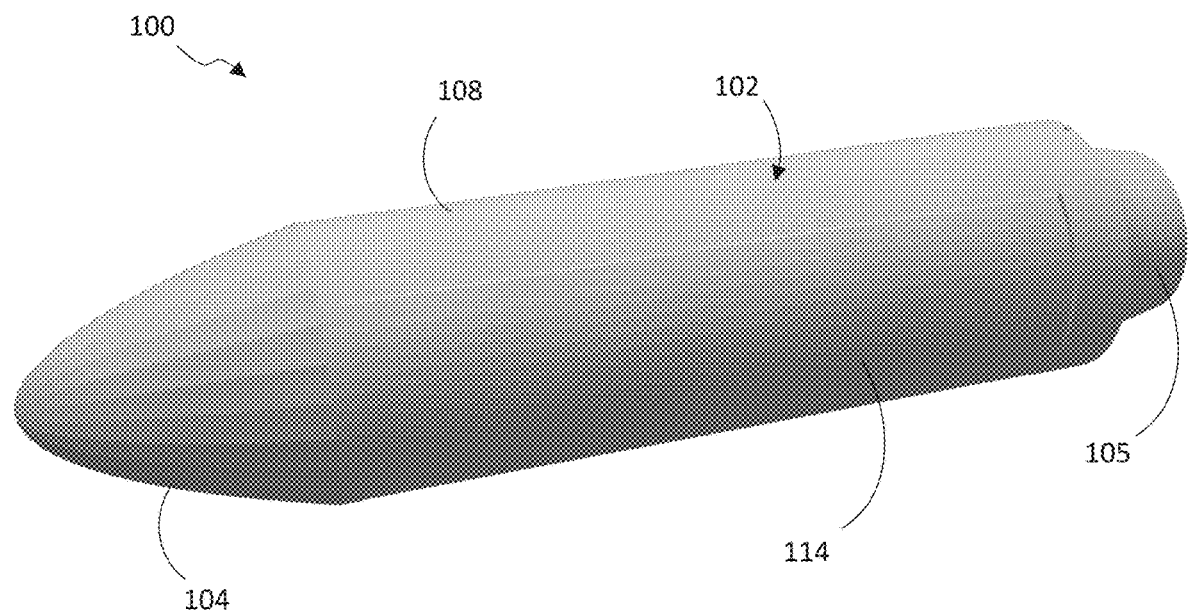
FIG. 1 is a perspective view of an embodiment of the present invention when in a launch configuration.
Figure 2:
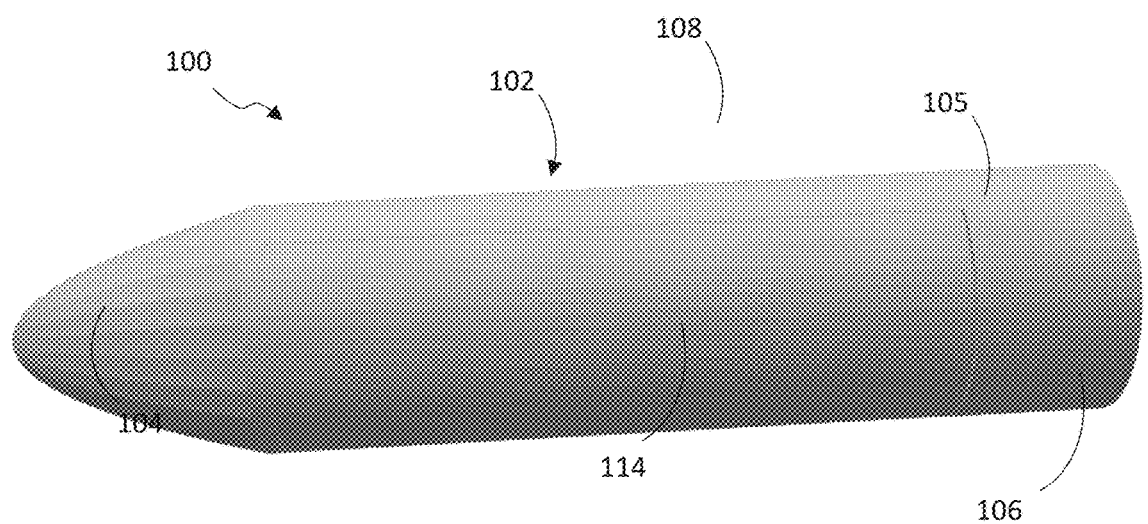
FIG. 2 is a perspective view of an embodiment of the present invention when in a launch configuration with an initial propulsor on the aft end of the UV.

As shown in FIG. 1, some embodiments of UV 100 have main body 102 extending between nose cone 104 at a fore end of UV 100 and thrust nozzle 105 at an aft end of UV 100. As depicted in FIG. 2, some embodiments further include sabot 106 encasing nozzle 105. Sabot 106 is configured to protectively enclose nozzle 105 during the initial launch of UV 100 from the launch tube. Sabot 106 is included when the launch is an explosive charge or other launch mechanism that could damage nozzle 105.

Some embodiments further include an initial propulsor (not depicted) to launch UV 100 and/provide additional thrust power during flight. The initial propulsor may reside within the launch tube (or other launch device) or may reside on UV 100. In some embodiments, the initial propulsor resides aft of sabot 106. In other embodiments, the initial propulsor resides fore of nozzle 105 and can work in conjunction with nozzle 105 to propel UV 100. In some embodiments, the initial propulsor is permanently secured to UV 100, while in other embodiments, the initial propulsor can be jettisoned from UV 100 after the launch. In embodiments in which the initial propulsor is jettisoned, UV 100 includes any jettisoning devices known to a person of ordinary skill in the art for jettisoning the initial propulsor.

The initial propulsor can be any propulsion system known to a person of ordinary skill in the art. In some embodiments, the initial propulsor is similar to those used to launch a typical mortar round or other projectiles from a launch tube. In other embodiments, the initial propulsor may be any other device configured to discharged UV 100 form a launch tube/launch device. The design of the initial propulsor is based on the type of deployment system used to launch UV 100 and whether UV 100 will be launched from a stationary position, a moving vehicle, in air, or in water.

Referring back to nozzle 105, some embodiments are configured to provide thrust vectoring to direct UV 100 in one or more directions. Thrust vectoring can be achieved using any known methods and mechanisms, including but not limited to gimbaled nozzles. Moreover, nozzle 105 is configured to direct thrust in an aft direction during the initial launch and/or during flight with an onboard initial propulsor fore of nozzle 105 or when engines 116 are axially aligned (also referred to as the launch/missile configuration) and providing thrust as will be explained in greater detail below.

Some embodiments include nose cone 104 at the fore end of main body 102. Nose cone 104 is designed to reduce drag both when initially deployed and during operation. Thus, an embodiment of nose cone 104 has a conical shape. However, nose cone 104 can have any shape including those that improve the aerodynamics of UV 100.

Some embodiments of nose cone 104 further include a fluid intake aperture designed to direct air or water flow through nose cone 104 and into main body 102 where one or more engines 116 (when in a launch/missile configuration) can further propel the fluid in an aft direction to create thrust. In such embodiments, the aft end of main body 102 preferably includes thrust vectoring nozzle 105 through which the air exits UV 100 allowing UV 100 to operate in the missile configuration. In some embodiments, the air intake is centrally located through the vertex of nose cone 104 and engines 116 are generally axially aligned within main body 102 to produce thrust that is generally axially aligned with the longitudinal axis of UV 100.

In some embodiments, nose cone 104 includes a power source, a plurality of electronics to aid in the flight and control of UV 100, and/or other sensors used to complete a mission. However, some embodiments include nose cone 104 that can be jettisoned to achieve certain operational needs. In embodiments in which nose cone 104 is jettisoned, UV 100 includes any jettisoning devices known to a person of ordinary skill in the art for jettisoning nose cone 104.

In some embodiments, the electronic and power systems are contained in main body 102. Preferably the weight of these systems and/or the aircraft as a whole are evenly distributed about main body 102 in both a circumferential direction and an axial/longitudinal direction to maintain a stable aircraft during flight. Such embodiments allow for nose cone 104, nozzle 105, engine bay doors 114, and/or wings 122 and horizontal stabilizers 124 to be jettisoned to reduce the weight of UV 100. In embodiments in which various components are jettisoned, UV 100 includes any jettisoning devices known to a person of ordinary skill in the art for jettisoning said components.

Main body 102 is generally comprised of structural frame 108 and engine bay doors 114. In some embodiments, main body 102 has a generally circular cross-sectional shape to match the contour of an internal surface of the intended launch tube. However, some embodiment of main body 102 may have a cross-sectional shape that is not perfectly circular to alter the aerodynamics of UV 100 during flight. In addition, main body 102 establishes an internal cavity referred to as engine bay 118. Engine bay 118 is sized and shaped to house one or more propulsion engines 116, which provide the operational propulsion for UV 100.

Figure 6:
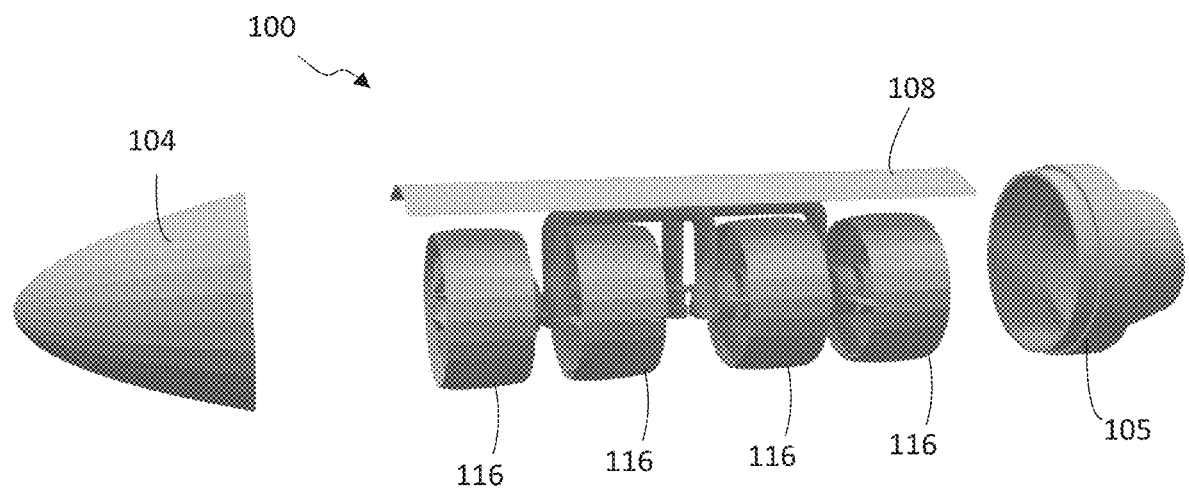
FIG. 6 is an exploded perspective view of an embodiment of the present invention with the engine bay doors removed and the nose cone and nozzle detached from the UV.

Structural frame 108 generally extends the length of main body 102. Structural frame 108 is designed to withstand the launch force of the initial propulsor and in some embodiments, structural frame 108 includes housing 109 (see FIG. 6) configured to house the electrical and/or power systems. Structural frame 108 further acts as the structural foundation for articulating arms 110 of UV 100, which will be described in greater detail below.

In some embodiments, as depicted in FIGS. 1-10, structural frame 108 has an outer surface 112 that has a generally circular or semi-circular cross-sectional shape. In addition, outer surface 112 preferably aligns concentrically with one or more engine bay doors 114 (when closed) to create a flush cylindrical shape as depicted in FIGS. 1-2. In some embodiments, the semi-circular cross-section of outer surface 112 extends 180 degrees or less to allow engines 116 to exit engine bay 118 when engine bay doors 114 are opened. While structural frame 108 is shown as residing on an upper half of main body 102, some embodiments include structural frame 108 residing on the lower half of main body 102.

As explained above, engine bay doors 114 are sufficiently sized to allow engines 116 to exit engine bay 118. In some embodiments, UV 100 has two engine bay doors 114 that comprise 180 degrees or more of the cross-sectional shape of main body 102. As such, engines 116 can have a diameter nearly the size of the cross-sectional diameter of main body 102 and still exit engine bay 118.

Figure 4:
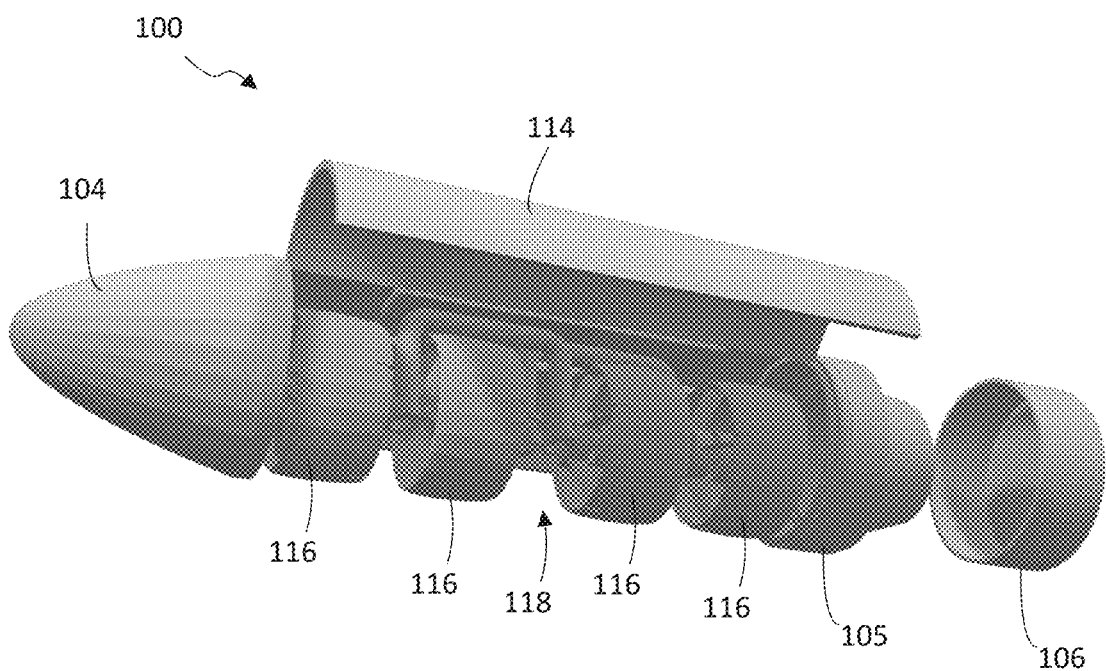
FIG. 4 is a bottom perspective view of an embodiment of the present invention with the engine bay doors open and the initial propulsor detached from the UV.
Figure 5:
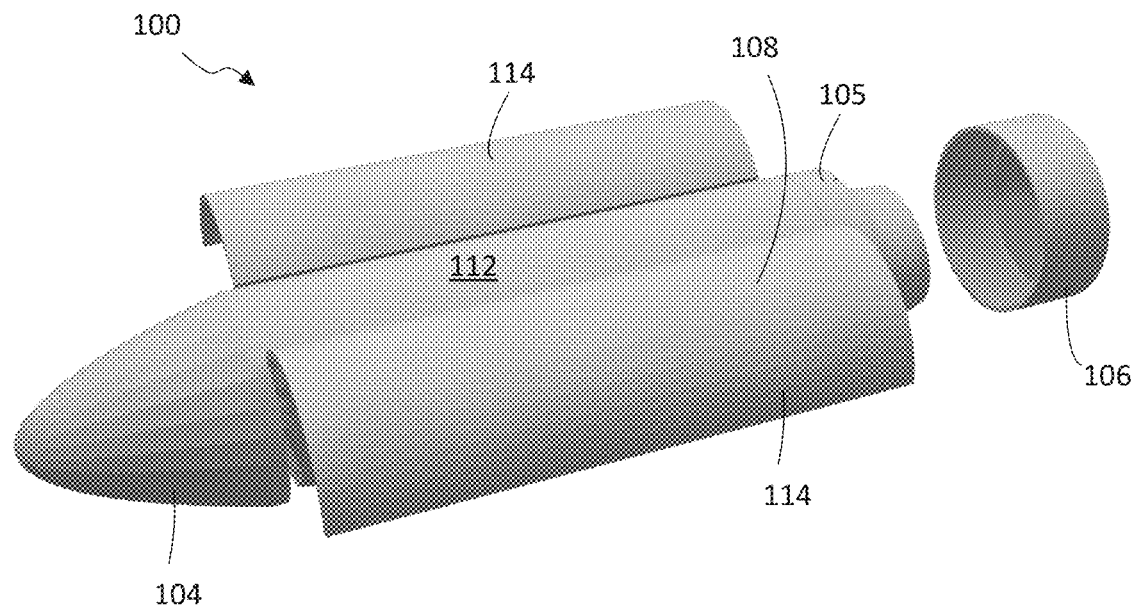
FIG. 5 is a top perspective view of an embodiment of the present invention with the engine bay doors open and the initial propulsor detached from the UV.

In some embodiments engine bay doors 114 are configured to jettison from UV 100 at some point after UV 100 exits the launch tube as illustrated in FIGS. 7-10. However, some embodiments include engine bay doors 114 pivotally connected to structural frame 108 as depicted in FIGS. 4-5. As a result, engine bay doors 114 can be reused in subsequent launches and allow UV 100 to convert back into a projectile shape. In addition, engine bay doors 114 can operate as wings when pivoted to an open orientation (as illustrated in FIGS. 4-5). Moreover, some embodiments of engine bay doors 114 include a camber profile to improve the flight characteristics of engine bay doors 114 when operating as wings. In addition, in some configurations engine bay doors 114, in the wing configuration can pivot on a fixed point on the body to increase the wingspan for additional lift.

Engine bay doors 114 can be controlled via motors, springs, or other biasing components configured to forcefully move doors 114 into an opened configuration and/or a closed configuration. In embodiments in which doors 114 are jettisoned, UV 100 includes any jettisoning devices known to a person of ordinary skill in the art for jettisoning doors 114.

Referring now to FIGS. 7-10, after the initial launch, UV 100 can operate in a longitudinally aligned, axially thrust configuration (see FIG. 7), an axial thrust configuration (see FIG. 8), a vertical thrust configuration, (see FIG. 9), or any variation between axial and vertical thrust. In some embodiments, as will be explained in greater detail below, UV 100 can also operate in a land vehicle configuration (see FIG. 10).

Figure 3:
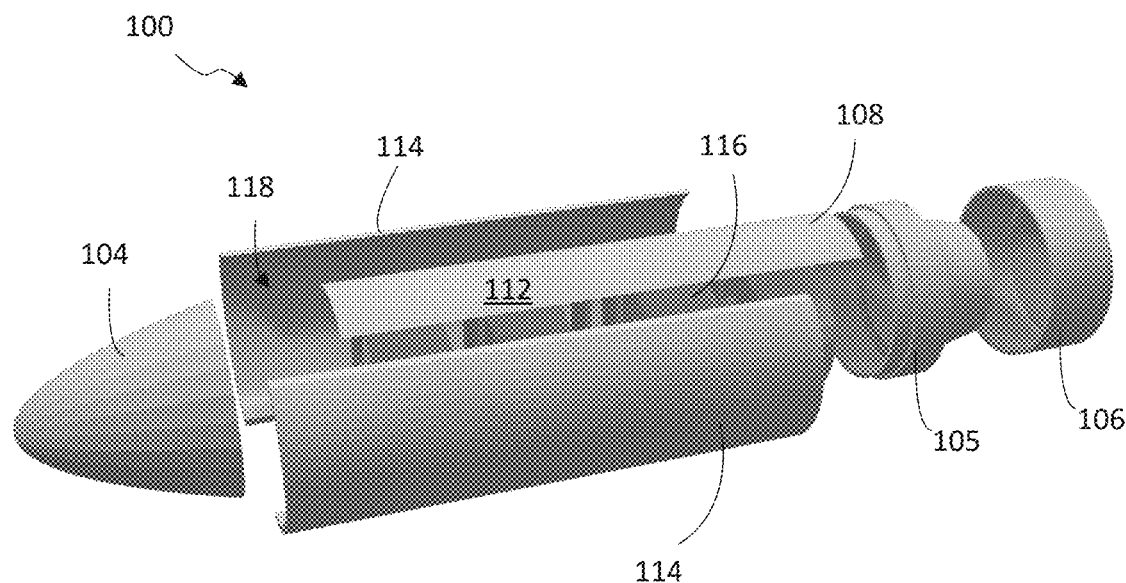
FIG. 3 is an exploded perspective view of an embodiment of the present invention.

Referring now to FIGS. 3-5, in some embodiments, the propulsion engines 116 are fan engines. In some embodiments, the fan engines are controlled by electric motors connected to a power source on UV 100. In some embodiments, the fan engines are ducted. The fan engines are sized, such that the outer diameter as established by the rotating blades (in a shroud-less fan engine) or the outer diameter of the shroud enclosing the blades is less than the inner diameter of main body 102, when main body 102 is in the closed, launch configuration. Thus, engines 116 can be stored within engine bay 118 when in the launch configuration or if operating in the missile configuration.

Figure 8:
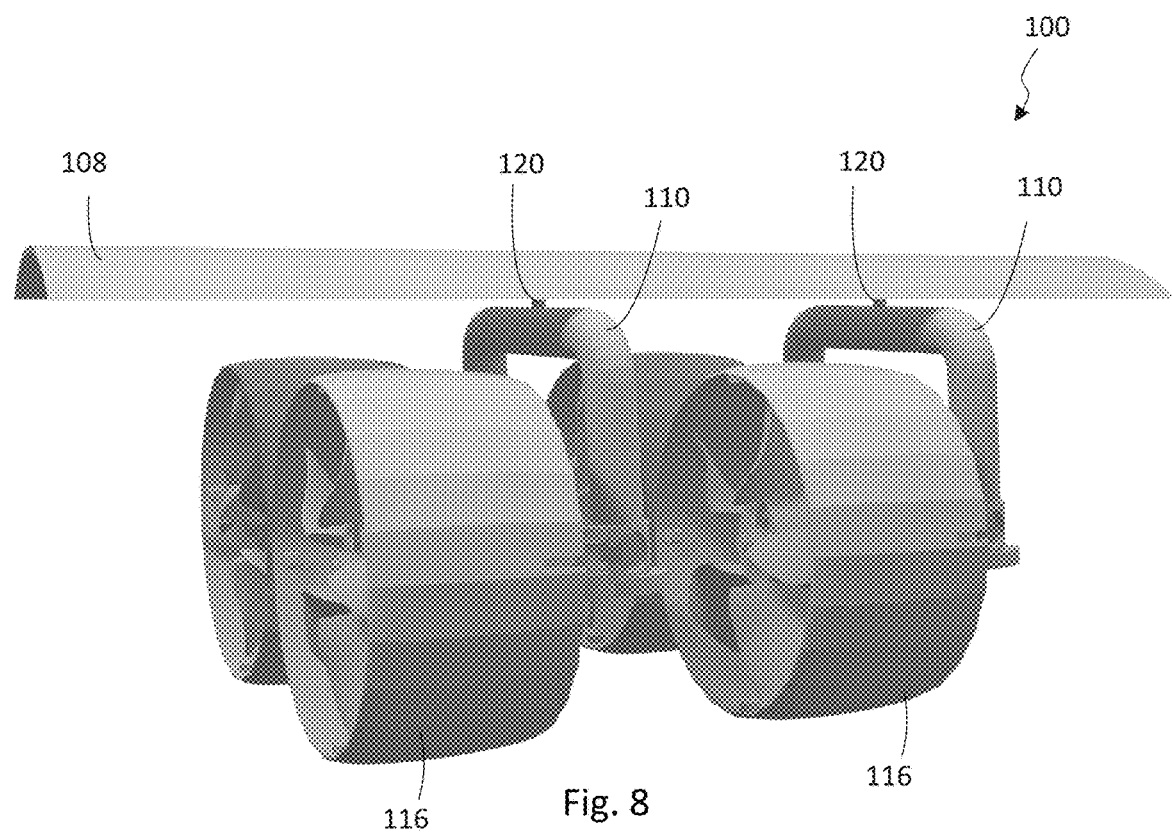
FIG. 8 is a perspective view of an embodiment of the present invention in an axial thrust configuration.
Figure 9:
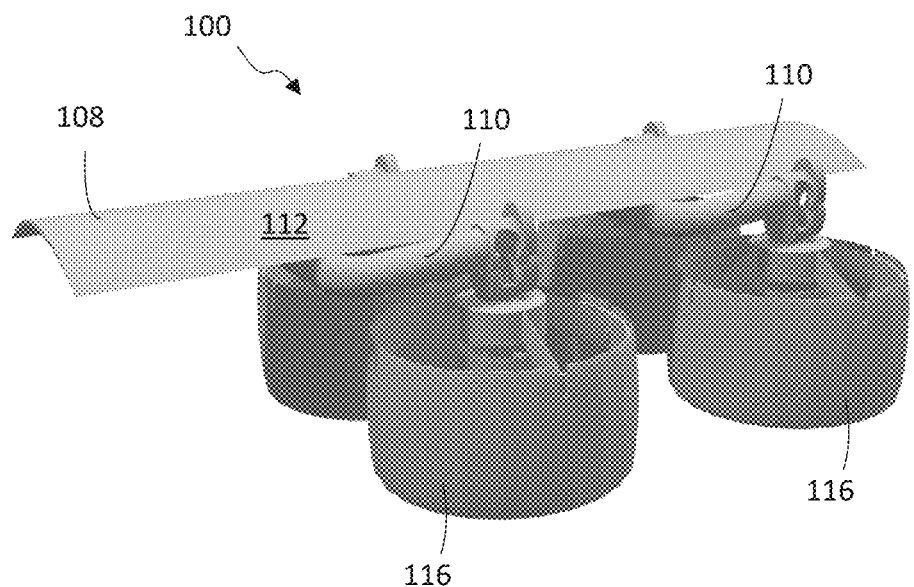
FIG. 9 is a perspective view of an embodiment of the present invention in a vertical thrust configuration.
Figure 10:
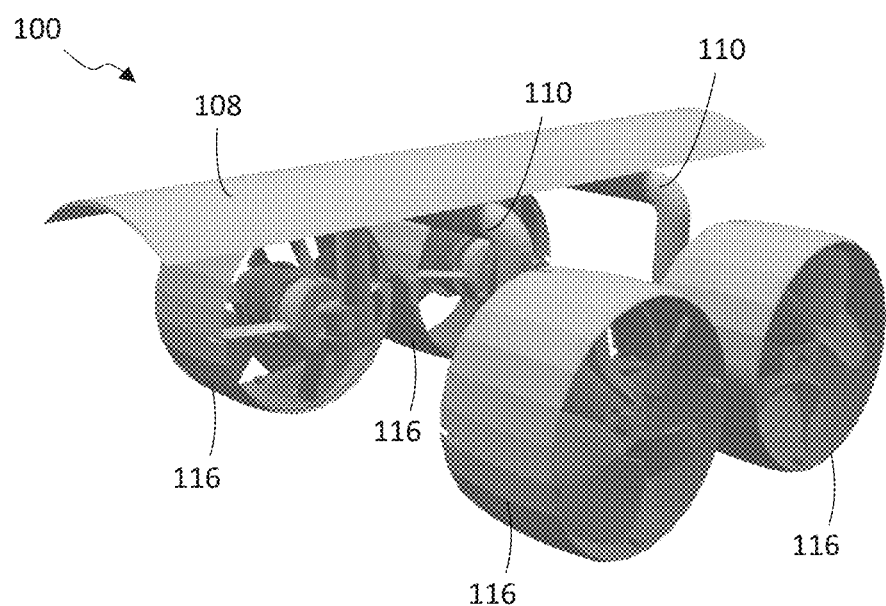
FIG. 10 is a perspective view of an embodiment of the present invention in land vehicle configuration.

Each fan engine 116 is secured to one of the articulating arms 110. Articulating arm 110 may be spring-loaded, or motor controlled to move from a stored position (see FIG. 7) to an extended position as depicted in FIGS. 8-10. In the stored position, articulating arms 110 and engines 116 reside within engine bay 118. When in the extended position, articulating arms 110 and engines 116 reside at least partially outside of engine bay 118.

As provided in the exemplary figures, some embodiments of UV 100 include two pairs of articulating arms 110, however, more or less articulating arms can be used in different embodiments. Each pair of arms 110 has a generally inverted U-shape and a vertical rotational axis about which the U-shaped arms rotate. In some embodiments, the vertical rotational axis passes through mount 120. In some embodiments, arms 110 rotate about mount 120. In some embodiments, mount 120 rotates relative to structural support 108. While the depicted mount is shown as a cylindrical member, it should be understood that alternative mounts may be used to connect arms 110 to structural support 108 in a rotatable manner.

In some embodiments, arms 110 are further configured to rotate about a lateral axis of UV 100 as exemplified in FIG. 9. In some embodiments, each mount 120 is secured to its respective arms 110 via a mechanism configured to allow arms 110 to rotate about a lateral axis of UV 100. The rotation about the lateral axis may be accomplished through any motor/controller known to a person of ordinary skill in the art.

In some embodiments, mount 120 includes a gear component on the end connected to arms 110 which is configured to engage a drive mechanism residing with arms 116. A motor is further provided within arms 110 and causes the drive mechanism to operably interact with the gear component on mount 120. Arms 110 further include a slot extending about at least a portion of the circumference of arms 110 in a direction generally perpendicular with the longitudinal axis of UV 100. The drive mechanism causes the arms 110 to pitch/rotate relative to the mount 120 and the slot allows mount 120 to remain vertical while arms 110 rotate. Some embodiments, however, use alternative connections between arms 110 and structural support 108 to achieve the desired rotatability of arms 110 about a lateral axis of UV 100. The rotation about the lateral axis may be accomplished through any motor/controller known to a person of ordinary skill in the art.

In some embodiments, arms 110 are configured to rotate about both a vertical axis and a lateral axis of UV 100 to provide greater maneuverability of arms 110. As such UV 100 can alter the orientation of arms 110 to achieve various configurations.

Figure 7:
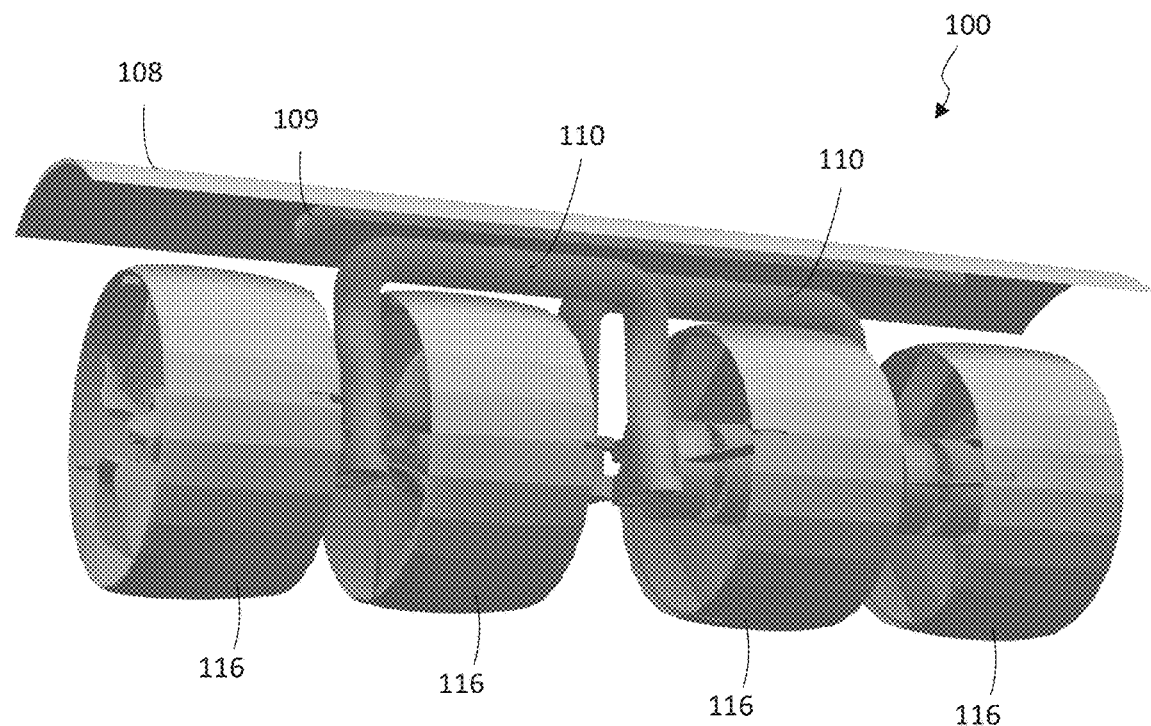
FIG. 7 is a perspective view of an embodiment of the present invention in an axially aligned axial thrust configuration.

One such configuration includes arms 110 in a stored position as exemplified in FIG. 7. This configuration is used for launching UV 100 and allowing it to operate in a missile configuration. When arms 110 are in a stored position, U-shaped arms 110 are rotated about the vertical rotational axis until U-shaped arms 110 reside within a plane that is generally parallel to the longitudinal axis of main body 102. In addition, engines 116 are rotated so that the rotational axes of the rotors (aka "rotational blades") are generally parallel to the longitudinal axis of main body 102. As a result, arms 110 and engines 116 reside within engine bay 118 when in the stored configuration. In some embodiments, engines 116 are of a size such that they do not need to be rotated so that the rotational axes of the rotors are generally parallel to the longitudinal axis of main body 102 to fit within engine bay 118.

Arms 110 also include an extended position in which each U-shaped articulating arm 110 rotates generally 90 degrees about the vertical rotational axis. As a result, at least a portion of arms 110 and fan engines 116 extend outside of engine bay 118 or laterally away from the longitudinal axis of main body 102. The rotation about the vertical axis may be accomplished through any motor/controller known to a person of ordinary skill in the art.

Arms 110 also include a pitched position, as introduced in previous paragraphs. The pitched position includes arms 110 extended laterally away from the longitudinal axis of main body 102 and rotated about a lateral axis of UV 100 as exemplified in FIG. 9. The rotation about the lateral axis may be accomplished through any motor/controller known to a person of ordinary skill in the art.

Some embodiments of UV 100 further include engines 116 rotatably and/or pivotably connected to the distal end of their respective arms 110 to allow engines 116 to move into different orientations, which are illustrated in FIGS. 7-10. In some embodiments, the rotatable connection allows engines 116 to rotate about an axis that is generally aligned or parallel with the central axis of the distal end of articulating arm 110 to which engines 116 is attached. However, the pivotable connection may include more than one degree of freedom to allow for greater maneuverability.

The combination of articulating arms 110 and the rotatable connection of engines 116 to articulating arms 110 allows UV 100 to achieve at least the following three different configurations: the missile or launch configuration, axial thrust configuration, and vertical thrust configuration. As previously explained, the launch or missile configuration includes articulating arms 110 and engines 116 residing within engine bay 118. Preferably, the rotors are concentrically aligned with the longitudinal axis of main body 102.

The axial thrust configuration is shown in FIG. 8 and includes the rotational axes of the rotors in a generally parallel orientation with respect to the longitudinal axis of main body 102. However, each engine 116 can rotate about the central axis of the distal end of its respective articulating arm 110 to which engine 116 is attached to provide directional thrust in a starboard or port direction.

The vertical thrust configuration is shown in FIG. 9. UV 100 can transition to this configuration by simply rotating articulating arms 110 about the lateral rotational axis of articulating arms 110 to position the thrust vector of engines 116 in a vertical direction. Moreover, the transition from the axial thrust configuration to the vertical thrust configuration has an infinite number of engine positions in which the thrust vector is neither completely axial nor completely vertical. In addition, when UV 100 is in the vertical thrust configuration or any configuration between the axial and vertical thrust configurations, engines 116 can rotate about the central axis of the distal end of articulating arms 110 to provide directional thrust in a starboard or port direction. It should also be noted that some embodiments include each arms 110 independently operable from each other to allow for greater operational variability.

Some embodiments of UV 100 further include a land traversing configuration. Such embodiments employ a ducted fan engine 116 adapted to operate as both a thrust producing fan engine and a rotating drive wheel. More specifically, engine 116 is configured to cause the shroud to rotate, which allows engine 116 to operate as a drive wheel. To capitalize on such an engine, UV 100 has an additional configuration in which the articulating arms are in a similar position as the axial thrust configuration, but each rotor's rotational axis is directed in a generally lateral direction as shown in FIG. 10. In this configuration, UV 100 can drive along a surface rather than operating as a thrust producing engine/motor.

Referring now to FIGS. 11-14, some embodiments of UV 100 include foldable/collapsible wings 122 and foldable/ collapsible horizontal stabilizers 124. In addition, some embodiments include structural support 108 having a rounded or aerodynamically shaped front end. Structural support 108 may further include an extent having a lifting camber shape to improve the lift characteristics of structural support 108.

Similar to other embodiments, UV 100 includes engine bay doors 114 configured to enclose around the internal components of UV 100, including structural support 108. In the exemplary embodiment, doors 114 create a full cylinder when in the closed position. After launch, doors 114 are configured to disconnect from each other and fall away from UV 100. UV 100 includes any jettisoning devices known to a person of ordinary skill in the art for jettisoning the doors 114.

It should be noted that there may be two or more doors 114 configured to complete the cylindrical shape and each of the doors is configured to detach from UV 100. In some embodiments, structural support 108 is temporarily attached to doors 114 similar to the embodiments depicted in FIGS. 1-10. In other embodiments, doors 114 completely encircle structural support 108.

Figure 11:
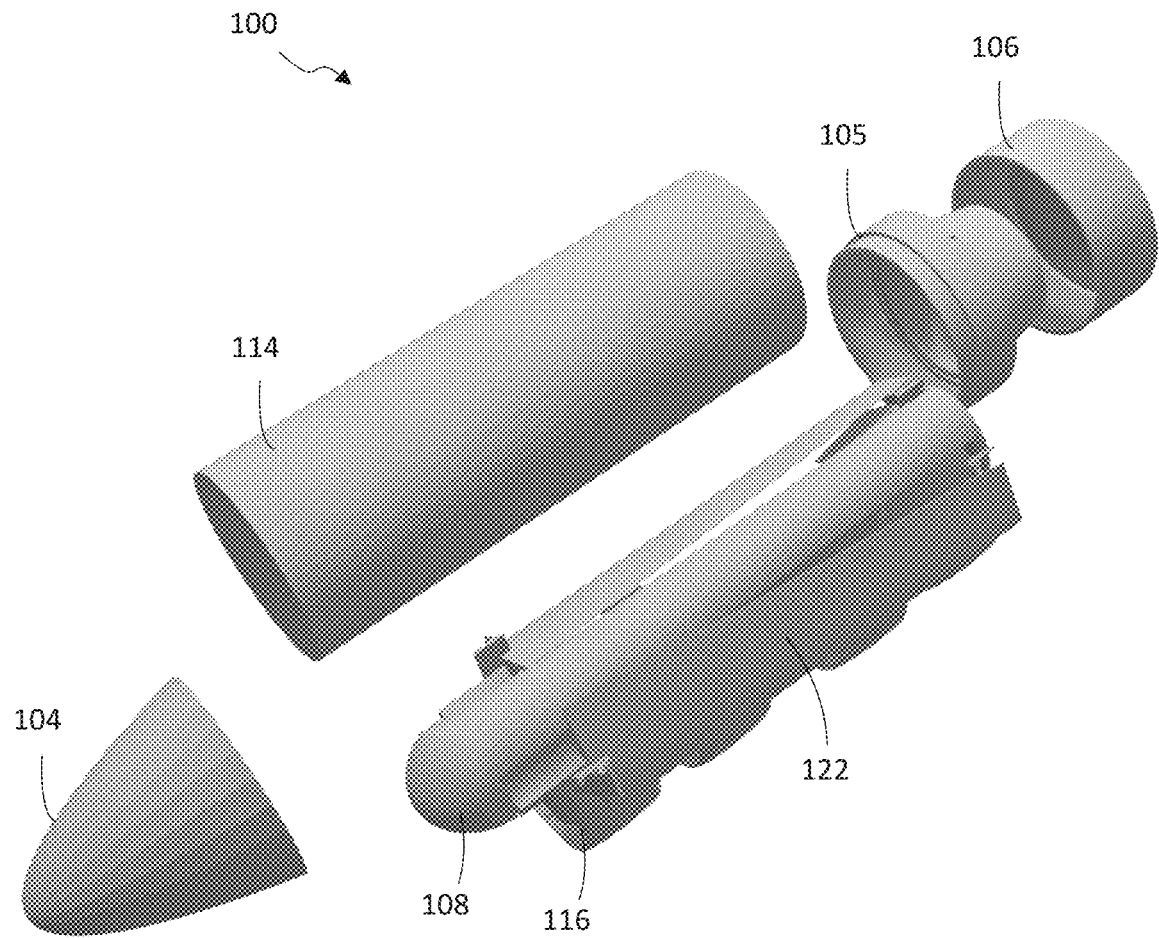
FIG. 11 is an exploded perspective view of an embodiment of the present invention.
Figure 12:
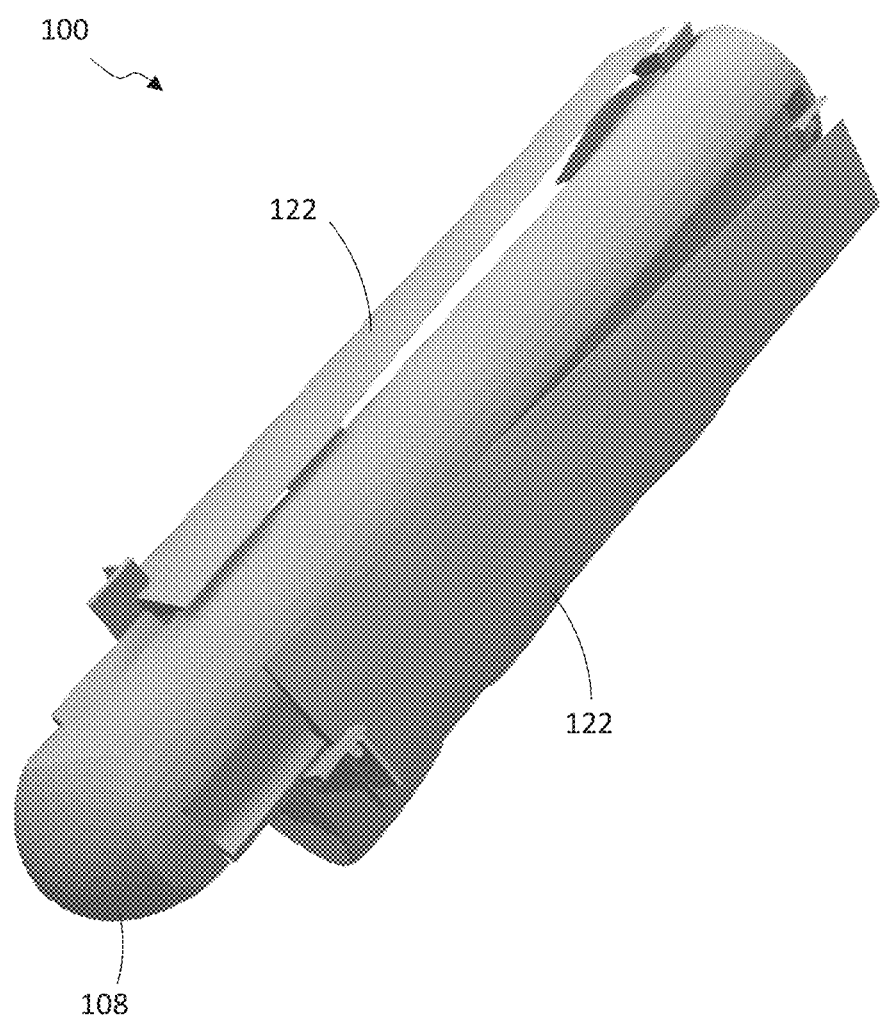
FIG. 12 is a top perspective view of an embodiment of the present invention with the engine bay doors, nose cone, nozzle, and the initial propulsor detached from the UV and the wings in a stored position.
Figure 13:
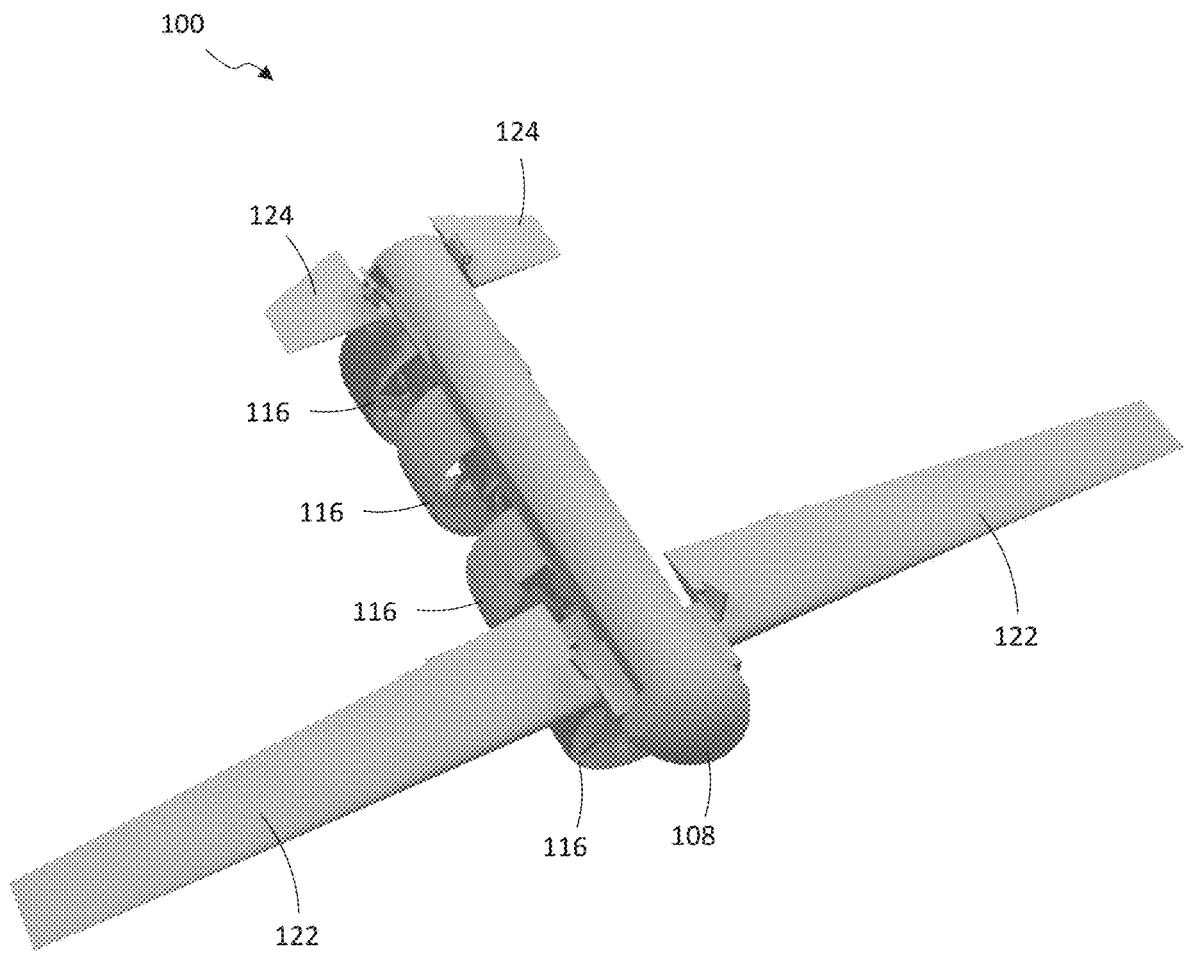
FIG. 13 is a top perspective view of an embodiment of the present invention with the wings in an extended position.
Figure 14:
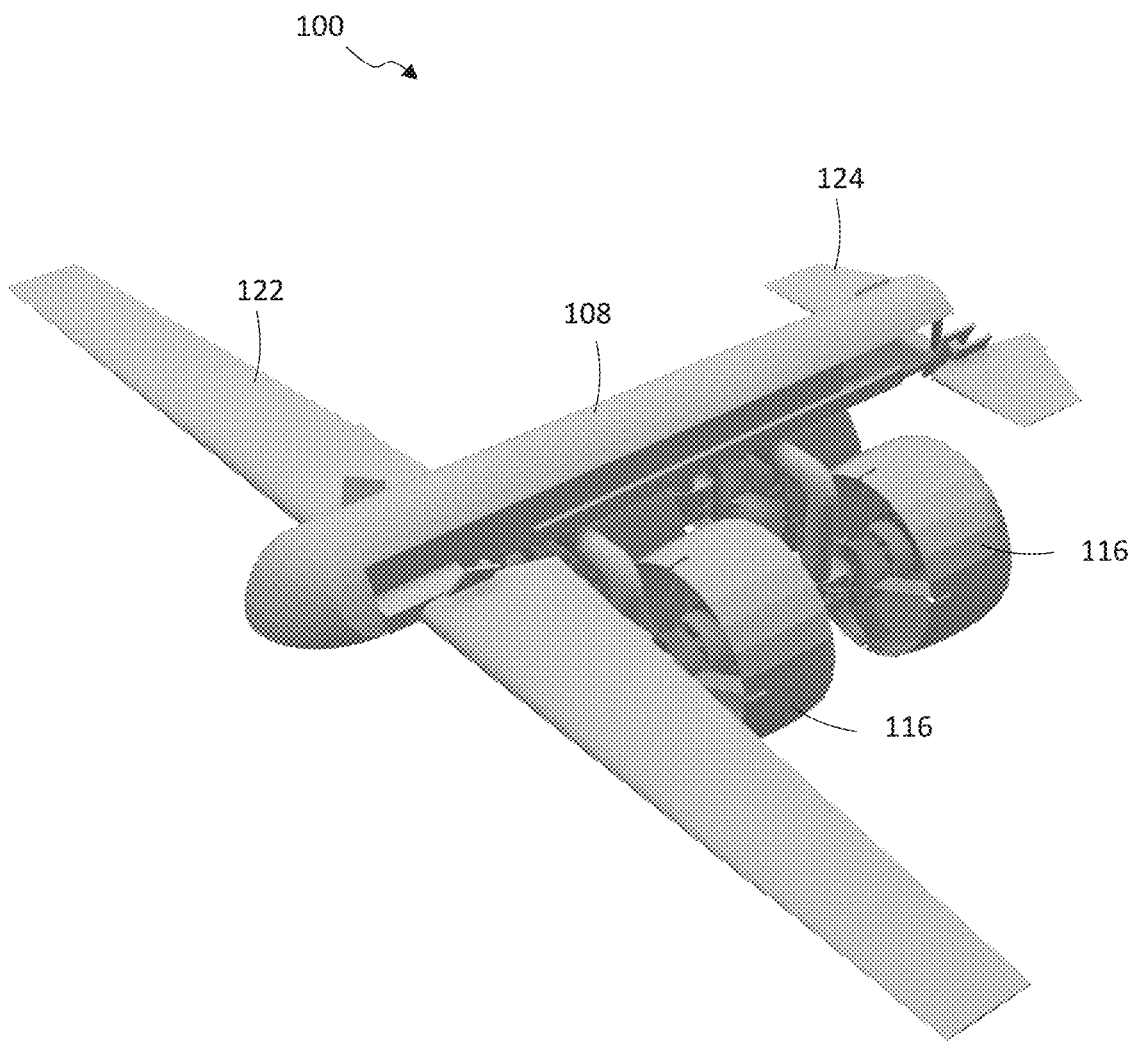
FIG. 14 is a top perspective view of an embodiment of the present invention with the wings in an extended position and the engines in an axial thrust orientation.

Wings 122 and horizontal stabilizers 124 are pivotably attached to structural support 108 such that they can fold inwardly into a retracted position as depicted in FIGS. 11-12 and extend outwardly into an extended position as shown in FIGS. 13-14. Any mechanisms known in the art can be used to control the pivoting of wings 122 and horizontal stabilizers 124. For example, wings 122 and horizontal stabilizers 124 can be hingedely connected to structural support 108 and include a torsion spring, or any other biasing component, configured to force wings 122 and horizontal stabilizers 124 into an extended position when doors 114 are jettisoned from UV 100. Some embodiments include motors and/or controllers configured to rotate wings 122 and horizontal stabilizers 124 into an extended position and/or into a retracted position.

Some embodiments include additional rotational mechanisms configured to dynamically pitch wings 122 and horizontal stabilizers 124 relative to structural support 108 to provide UV 100 with dynamic control surfaces during flight. Any mechanisms known in the art can be used to control the pitch of wings 122 and horizontal stabilizers 124. In addition, some embodiments of UV 100 include additional conventional control surfaces that are stored during launch and deployed as needed to provide greater flight control.

Some embodiments further include jettisoning devices to jettison wings 122 and/or horizontal stabilizers 124 when UV 100 converts to a vertical thrust configuration or a land vehicle configuration. However, motor-controlled wings 122 and horizontal stabilizers 124 allow wings 122 and horizontal stabilizers 124 to be stored when in the vertical thrust configuration or land vehicle configuration so that UV 100 can reuse wings 122 and horizontal stabilizers 124 allow wings 122 as needed.

Like previous embodiments, winged UV 100 includes the same articulating arms and pivotable engines to allow the UV 100 to convert between the various configurations described herein. FIG. 14 provides one such example of winged UV 100 in the axial thrust configuration. Due to the adjustability of arms 110 and engines 116, wings 122 and horizontal stabilizers 124 are spaced from engines 116 to avoid obstructing the movement of arms 110 and engines 116.

While the depicted embodiments show UV 100 with 4 fan engines, it should be noted that some embodiments have more or less than 4 engines. For example, an embodiment could include a single engine, 2 engines, 3 engines, 5 engines, etc. In addition, while the depicted engines are ducted electric fan motors, alternative motors and engines may be used in some embodiments.

Moreover, while the exemplary images depict articulating arms for adjusting the location of engines 116, some embodiments may use other structures and/or devices to move engines 116 between the launch positions and the one or more operational positions.

Furthermore, while UV 100 is particularly adept for flight, the same flight controls can be used to maneuver UV 100 underwater. Accordingly, some embodiments are waterproof to enable underwater travel.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An unmanned vehicle, comprising:
    a launch configuration and at least one operational configuration;
    a main body, the main body including:
        a structural support extending generally between a fore end and an aft end of the unmanned vehicle;
        an outer surface having a generally cylindrical shape with an engine bay established within the outer surface of the main body;
        a door leading to the engine bay, the door configured to be opened to expose an engine residing within the engine bay when the unmanned vehicle is in the launch configuration;
    a first articulating arm operably connected to the structural support, the first articulating arm pivotably connected to the engine and configured to move at least a portion of the engine outside of the engine bay;
    wherein the at least one operational configuration of the unmanned vehicle includes the engine residing at least partially outside of the engine bay.

2. The unmanned vehicle of claim 1, further comprising a first pair of engines configured to reside within the engine bay when the unmanned vehicle is in the launch configuration.

3. The unmanned vehicle of claim 2, wherein the first articulating arm is rotatably secured to the structural support and includes a pair of free ends, with each free end pivotably secured to one of the first pair of engines.

4. The unmanned vehicle of claim 3, wherein the launch configuration of the unmanned vehicle includes the first articulating arm rotated to a stored position, the stored position including the first pair of engines residing within the engine bay.

5. The unmanned vehicle of claim 3, wherein the at least one operational configuration of the unmanned vehicle includes the first articulating arm rotated to an extended position, the extended position including the first pair of engines residing at least partially outside of the engine bay.

6. The unmanned vehicle of claim 2, further comprising a second pair of engines configured to reside within the engine bay when the unmanned vehicle is in the launch configuration.

7. The unmanned vehicle of claim 6, further including a second articulating arm operably connected to the structural support, wherein the second articulating arm is rotatably secured to the structural support and includes a pair of free ends, with each free end pivotably secured to one of the second pair of engines.

8. The unmanned vehicle of claim 7, wherein the launch configuration of the unmanned vehicle includes the second articulating arm rotated to a stored position, the stored position including the second pair of engines residing within the engine bay.

9. The unmanned vehicle of claim 7, wherein the at least one operational configuration of the unmanned vehicle includes the second articulating arm rotated to an extended position, the extended position including the second pair of engines residing at least partially outside of the engine bay.

10. The unmanned vehicle of claim 1, further comprising a nose cone, the nose cone configured to detach from the main body when the unmanned vehicle transitions to the at least one operational configuration.

11. The unmanned vehicle of claim 1, wherein the engine bay door is configured to detach from the main body when the unmanned vehicle transitions to the at least one operational configuration.

12. The unmanned vehicle of claim 1, wherein the engine is a ducted fan engine.

13. The unmanned vehicle of claim 1, wherein the at least one operational configuration includes:
    an axial thrust configuration in which the engine is oriented to direct thrust in a direction that is towards an aft end of the unmanned vehicle; and
    a vertical thrust configuration in which the engine is oriented to direct thrust in a generally vertical direction.

14. The unmanned vehicle of claim 13, wherein the at least one operational configuration further includes a land vehicle configuration, the land vehicle configuration including:
    the engine having a shroud;
    the shroud in contact with a ground surface; and
    the engine configured to rotate the shroud, such that the shroud acts as a wheel.

15. The unmanned vehicle of claim 1, further including a pair of wings, each wing in the pair of wings including:
    a stored position in which the wing is configured to reside within the main body when the main body is in the launch configuration; and
    an extended position in which the wing extends laterally with respect to a longitudinal axis of the unmanned vehicle.

16. The unmanned vehicle of claim 1, further including a thrust vectoring nozzle secured to the aft end of the unmanned vehicle.

17. The unmanned vehicle of claim 1, further including an initial propulsor secured to the aft end of the unmanned vehicle.

18. An unmanned vehicle, comprising:
    a launch configuration and at least one operational configuration;
    a main body, the main body including:
        a structural support extending generally between a fore end and an aft end of the unmanned vehicle;
        an outer surface having a generally cylindrical shape with an engine bay established within the outer surface of the main body;
        a door leading to the engine bay, the door configured to be opened to expose engines residing within the engine bay when the unmanned vehicle is in the launch configuration;
    a first articulating arm operably connected to the structural support, the first articulating arm pivotably connected to a first pair of engines configured to reside within the engine bay when the unmanned vehicle is in the launch configuration and configured to move at least a portion of each of the first pair of engines outside of the engine bay;
    a second articulating arm operably connected to the structural support, the second articulating arm pivotably connected to a second pair of engines configured to reside within the engine bay when the unmanned vehicle is in the launch configuration and configured to move at least a portion of each of the second pair of engines outside of the engine bay;
    wherein the at least one operational configuration of the unmanned vehicle includes at least the first pair of engines or the second pair of engines residing at least partially outside of the engine bay.

19. The unmanned vehicle of claim 18, wherein:
    the first and second articulating arms are rotatably secured to the structural support;
    the launch configuration of the unmanned vehicle includes the first and second articulating arms rotated to a stored position, the stored position including the first and second pair of engines residing within the engine bay; and
    the at least one operational configuration of the unmanned vehicle includes at least the first articulating arm or the second articulating arm rotated to an extended position.

20. The unmanned vehicle of claim 19, wherein the at least one operational configuration includes:
    an axial thrust configuration in which the engine is oriented to direct thrust in a direction that is towards an aft end of the unmanned vehicle; and
    a vertical thrust configuration in which the engine is oriented to direct thrust in a generally vertical direction.

\* \* \* \* \*